United States Patent [19]
Finn et al.

[11] Patent Number: 4,523,877
[45] Date of Patent: Jun. 18, 1985

[54] J-TUBE METHOD AND APPARATUS

[75] Inventors: Lyle D. Finn, Houston; Bruce C. Volkert, Katy; Jamie F. Matthews, Jr., Houston, all of Tex.; Michael M. Brady, Cobham, England

[73] Assignee: Exxon Production Research Co., Houston, Tex.

[21] Appl. No.: 391,600

[22] PCT Filed: Aug. 21, 1980

[86] PCT No.: PCT/US80/01066
§ 371 Date: Mar. 5, 1982
§ 102(e) Date: Mar. 5, 1982

[87] PCT Pub. No.: WO82/00697
PCT Pub. Date: Mar. 4, 1982

[51] Int. Cl.³ .............................................. F16L 1/04
[52] U.S. Cl. ..................................... 405/195; 405/169
[58] Field of Search ............... 405/158, 168, 169, 173, 405/195; 166/367

[56] References Cited

U.S. PATENT DOCUMENTS

| | | | |
|---|---|---|---|
| 3,219,116 | 11/1965 | Matthews | 166/351 |
| 3,219,119 | 11/1965 | Matthews | 405/169 X |
| 3,226,728 | 12/1965 | Walvoord | 405/169 X |
| 3,298,092 | 1/1967 | Dozier et al. | 405/169 X |
| 3,434,296 | 3/1969 | Otteman et al. | 405/168 |
| 3,503,218 | 3/1970 | Broadway et al. | 405/169 |
| 3,557,564 | 1/1971 | Hauber | 405/169 |
| 3,595,312 | 7/1971 | Matthews | 405/168 X |
| 3,698,199 | 10/1972 | Matthews | 405/169 |
| 3,702,539 | 11/1972 | Matthews | 405/169 |
| 3,739,592 | 6/1973 | Plake | 405/169 |
| 3,967,462 | 7/1976 | DeJong | 405/169 |
| 4,100,753 | 7/1978 | Mott et al. | 405/169 |
| 4,194,568 | 3/1980 | Buresi et al. | 166/367 X |

FOREIGN PATENT DOCUMENTS 401582 3/1968 Australia.

OTHER PUBLICATIONS

"A New Deep-Water Platform-The Guyed Tower", Journal of Petroleum Technology, L. D. Finn, Apr. 1978, pp. 537-544.
"Field Test of a Guyed Tower", L. D. Finn and K. E. Young, OTC 3131, Offshore Technology Conference, May 1978.

Primary Examiner—David H. Corbin
Attorney, Agent, or Firm—Kenneth C. Johnson

[57] ABSTRACT

A method and apparatus for installing a pipeline riser (90) through a J-tube (40) at a spud can-founded, compliant, offshore platform (20) are disclosed. The J-tube is mounted on the platform above the maximum expected mudline (28). An upper longitudinal section (44) of the J-tube passes through guide rings (46) on the platform while a lower longitudinal section (48) is maintained free of the platform. After platform settlement, the J-tube is lowered to an elevation near the actual mudline (30). During riser installation through the J-tube, a lower end (54) of the J-tube is restrained from lateral movement by a latch (70) attached to the platform. Before production operations, the lower end is released from the latch so that flexibility of the J-tube accommodates movement of the platform.

5 Claims, 10 Drawing Figures 4,523,877

J-TUBE METHOD AND APPARATUS

DESCRIPTION

1. Technical Field

This invention pertains to the use of J-tubes on offshore platforms for installing service lines extending upwardly from the seafloor. More particularly, this invention pertains to the use of J-tubes for installing pipeline risers on compliant offshore platforms which settle in the seafloor.

2. Background Art

In offshore petroleum operations, a bottom-founded platform frequently serves as an operational base and a production terminal for oil and gas wells. In order to connect subsea pipelines to the platform deck, a vertical section of pipeline, called a riser, is often installed along the platform. J-shaped guide tubes, known as J-tubes, have been used to facilitate installation of such risers. This J-tube runs down along the length of the platform, bends near the seafloor and then runs generally parallel to the seafloor a short distance. The lower end of the J-tube frequently includes a flared portion referred to as a bellmouth.

Two basic methods are known for installing the pipeline riser in the J-tube once the J-tube is positioned. In the so-called J-tube method, the riser is inserted in the seafloor end of the tube and pulled through it with a cable or other means. In the so-called reverse J-tube method, disclosed in U.S. Pat. No. 3,595,312 (1971) issued to Matthews, a section of the riser is inserted in the deck end of the tube and is pulled or pushed down through it as additional sections of conduit are joined to the riser at the deck. Both of these methods place tension on the riser as it is forced through the J-tube. Unless resisted, this tension may cause displacements of the riser and J-tube which produce stresses that exceed the limits of the materials and cause damage to the riser of J-tube.

In the past, this problem has been approached by rigidly attaching the J-tube to the platform. The entire vertical length of the tube generally is clamped or welded to the structural members of the platform. In many cases, braces also have been placed across the bend section of the tube to prevent changes in curvature. This approach is not compatible with a compliant tower, such as a guyed tower, which is designed to move in response to environmental forces. Such a tower tilts about a point on its vertical axis some distance below the mudline, displacing the surrounding soil slightly. The tower also twists about its vertical axis. The motion of a compliant, guyed tower is described in Finn, L. D., "A New Deep-Water Platform—The Guyed Tower," Journal of Petroleum Technology (April 1978) pp. 537-544. After the riser is installed and connected to a subsea pipeline, the compliant tower moves relative to the subsea pipeline. If the J-tube is rigidly fixed to the tower, and the relative movement of the tower and subsea pipeline is not accommodated, the riser may fail.

Installation of the pipeline riser through the J-tube generally requires that the lower end of the J-tube be positioned within approximately five feet of the seafloor. In shallow water, the J-tube can be mounted on the platform with the assistance of divers after placement of the platform offshore. However, in deep water, the use of divers is not feasible. Consequently, in some cases, J-tubes have been fixed at the proper elevation on the platform during land fabrication. In some platform applications, however, the proper elevation of the J-tube on the platform cannot be predetermined during the land fabrication phase. For example, there is a class of platforms supported by weighted bearing surfaces called spud cans which penetrate the seafloor. An example of a spud can-founded platform is described in Finn, L. D. and Young, K. E., "Field Test of a Guyed Tower," OTC 3131, Offshore Technology Conference, May, 1978. Spud can-founded platforms may settle as much as sixty-five feet after placement and the extent of settling cannot be accurately predicted. In deep waters, divers cannot be used to assist in moving the J-tube after submersion. Thus, a means is needed for remotely positioning the J-tube at various elevations on the platform to accomodate various degrees of settling.

Methods are known for installing a J-tube on an offshore structure by lowering it from the water surface. U.S. Pat. No. 3,298,092 (1967) issued to Dozier et al discloses the installation of a J-tube on a subsea wellhead. A guideline is run from a barge to the wellhead. The J-tube is lowered along the guideline until it is landed on guide pins on the wellhead. A set screw is then tightened into a guide pin to fix the J-tube to the wellhead. U.S. Pat. No. 3,739,592 (1973) issued to Plake discloses the installation of a J-tube having a monorail on which male cone members are slidably mounted. The J-tube is positioned adjacent a platform which is provided with mating female cone members. As the J-tube is lowered, the male members are moved along the monorail to come into alignment and mate with the female members on the platform. The J-tube is then lowered to its final position by sliding the monorail through the male members. It is fixed in this position by locking the male members to the monorail. U.S. Pat. No. 3,434,296 (1969) issued to Otteman et al discloses a method for installing a J-tube provided with a carriage by lowering it on a track guide fixed to a platform. After the J-tube is lowered to the desired position, it is locked to the platform. The above references do not provide for the mounting of a J-tube on a platform at an initial elevation prior to erection and the subsequent lowering of the J-tube by remote means to a second elevation after a period of settling.

DISCLOSURE OF INVENTION

The present invention is a method and apparatus for installing a service line extending upwardly from the seafloor, such as a pipeline riser, at an offshore platform. In accordance with the invention, a J-tube is mounted on a platform at a location remote from the platform installation site, usually at an onshore location. It is positioned at an elevation on the platform above the maximum expected mudline. An upper longitudinal portion of the J-tube is connected to the platform in a manner which prevents it from moving laterally but permits it to be lowered along the platform. A substantial lower longitudinal portion of the J-tube is maintained free of the platform. A lower end of the J-tube is restrained in a manner preventing its lateral movement with respect to the platform while permitting it to be lowered along the platform. After the platform is placed on the seafloor, it settles in the seafloor to its substantially final elevation so that the mudline is established.

When it is desired to install the service line in the J-tube, the entire J-tube is lowered along the platform until its lower end is positioned a short distance above the mudline. The line then is drawn or pushed through the J-tube using known methods. While the line is being forced through the J-tube, the lower end of the J-tube is restrained in order to prevent excessive stress in the line and the J-tube.

After the service line is installed and before operation of the line is begun, the lower end of the J-tube is released from restraint and allowed to descend toward the seafloor. In this position of the J-tube, only its upper longitudinal portion is connected to the platform. The remainder of the J-tube is free to flex. The flexibility of the J-tube accommodates movement of the platform caused by environmental forces, without damage to the service line, J-tube, or associated equipment.

In a preferred embodiment of the invention, the lower end of the J-tube is restrained before and during installation of the service line by a releasable latch which is attached to the platform. The latch restrains lateral movement of the lower end with respect to the platform but permits the lower end to be moved longitudinally with respect to the platform.

BRIEF DESCRIPTION OF DRAWINGS

FIG. 8 shows the apparatus in a second position after settling of the platform.

FIG. 9 shows the apparatus in a third position with the J-tube lowered and a pipeline riser installed in the J-tube.

FIG. 10 shows the apparatus in a fourth position with the lower end of the J-tube released to the seafloor.

BEST MODE FOR CARRYING OUT THE INVENTION

Figure 1:
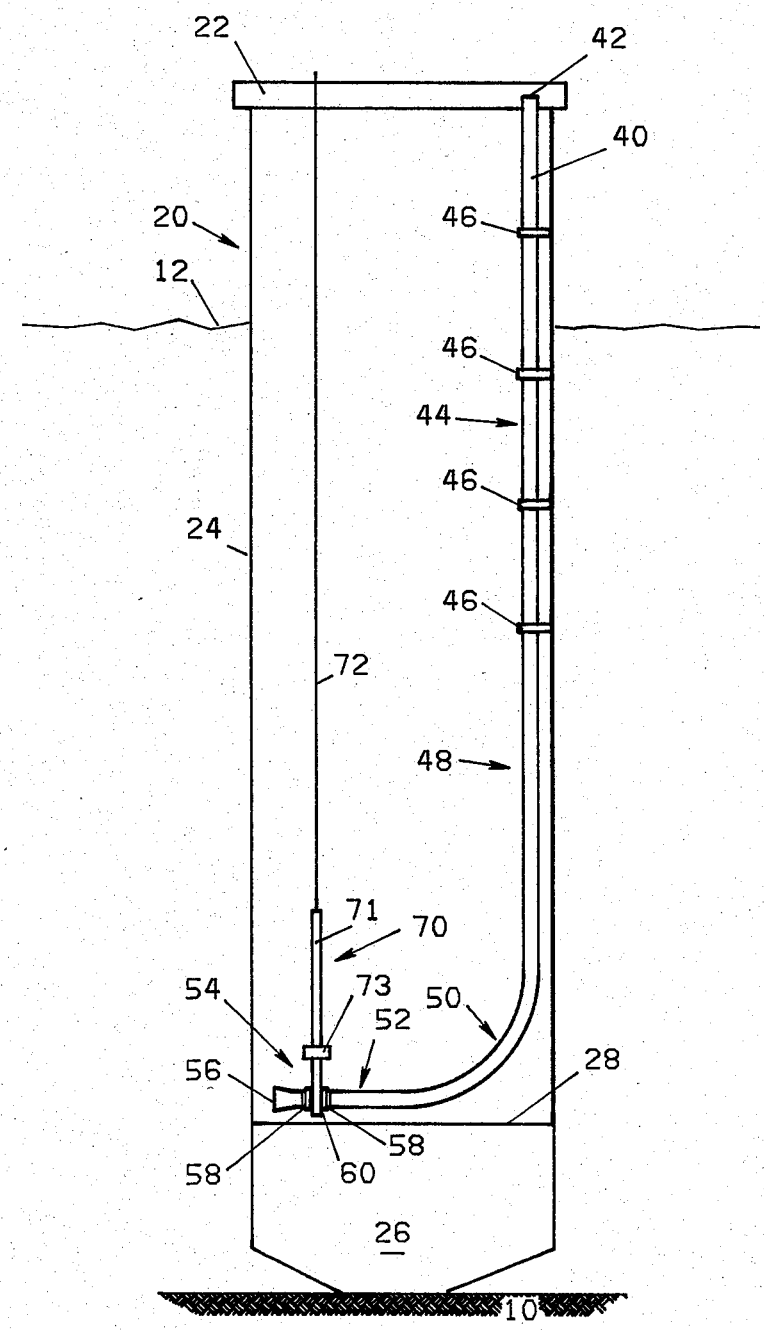
FIG. 1 is a schematic elevation view of our apparatus embodying the invention including a platform, a J-tube and a latch mechanism in an initial position, before settling of the platform.

FIG. 1 shows a platform 20 placed in its upright position on the seafloor 10. Platform 20 is a compliant structure, such as a guyed tower which is supported by anchored guylines (not shown). A portion of platform 20 including a working deck 22 extends above the ocean surface 12. The major portion of platform 20 is an open jacket 24 of structural members. The lower portion of the platform is a spud can 26. Spud can 26 is a stiffened shell which, when forced into the seafloor 10, serves as a foundation. The top of spud can 26 is at the maximum expected mudline 28 on platform 20 after penetration of the seafloor 10. The term mudline is used to refer to a line on the platform bordering the surface of the seafloor 10. Thus, if maximum expected settling of the platform occurs, the top of spud can 26 will be at the surface of the seafloor 10. So long as actual settling of the platform does not exceed maximum expected settling, the top of the spud can will not sink below the seafloor.

Platform 20 is provided with a J-shaped guide tube 40, commonly called a J-tube. J-tube 40 has an upper orifice 42 positioned above the ocean surface 12 for convenient access from the deck 22. An upper, generally longitudinal section 44 of J-tube 40 passes through a number of guide rings 46 which are fixed to platform 20. As used herein, the term longitudinal means along the greater dimension of the platform. The term lateral is used to mean perpendicular to the greatest dimension of the platform. Thus, when the platform is upright, as in FIG. 1, longitudinal parts of the J-tube are positioned vertically and lateral parts are positioned horizontally. The guide rings 46 prevent horizontal movement of section 44 with respect to platform 20. However, section 44 can be moved vertically through guide rings 46 and can rotate about its vertical axis. A substantial lower, generally longitudinal section 48 of J-tube 40 is free of platform 20 and therefore able to move with respect to it. Below section 48 is a bend section 50 which forms an approximately 90° curve in J-tube 40. Bend section 50 also is free of platform 20. The length of lower longitudinal section 48 is preferably greater than the radius of curvature of bend section 50. Below bend section 50 is a generally lateral section 52 of J-tube 40. A lower end 54 of J-tube 40 includes a flared portion, often referred to as a bell mouth, and terminates in a lower orifice 56. Platform 20 is also provided with a latch 70 positioned near the bottom of the platform. For the purpose of cooperating with latch 70, lower end 54 of the J-tube is closely fitted with two cylindrical collars 58 which form two raised surfaces on the circumference of the J-tube 40. The two collars 58 are spaced apart along the length of lower end 54 so that a narrow neck 60 on lower end 54 remains between the collars 58. Latch 70 includes a yoke 71 in which neck 60 of the J-tube is held. Yoke 71 is supported by a cable 72 run from platform deck 22 and passes through a guide 73 attached to platform 20. Yoke 71 is therefore in fixed lateral relationship to the platform.

Figure 2:
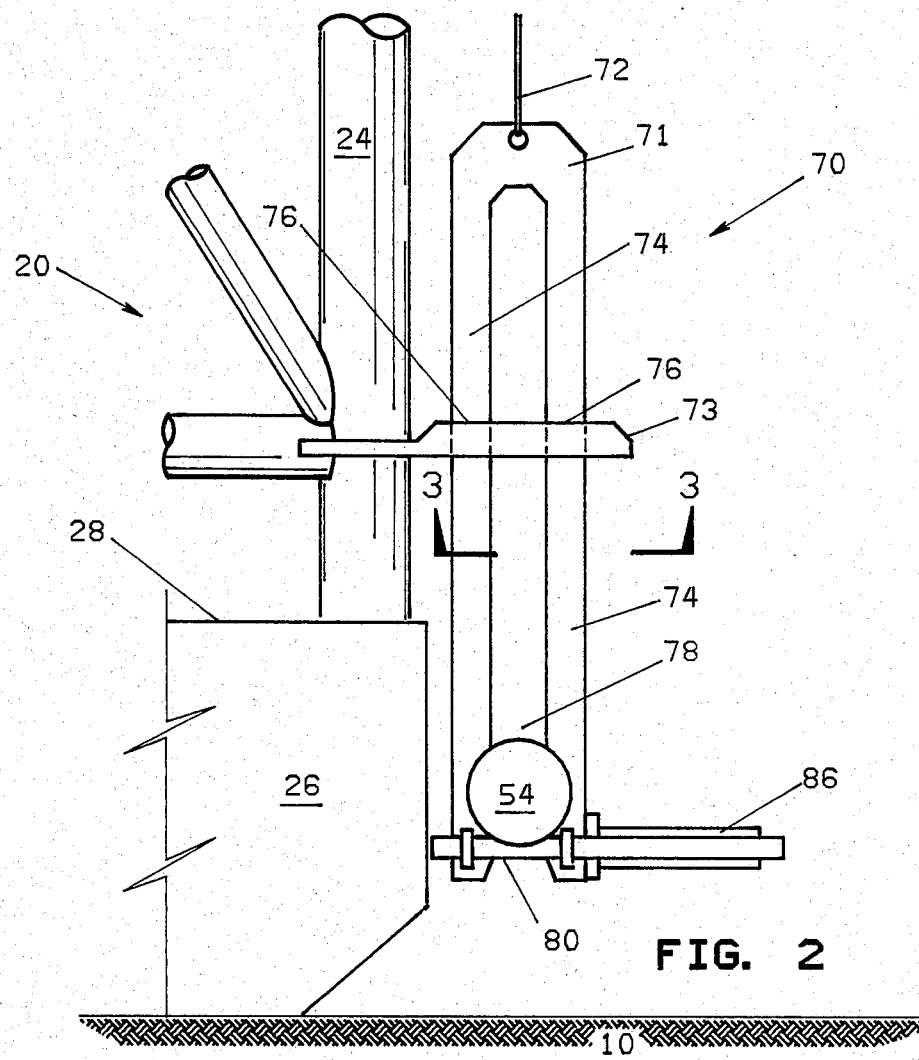
FIG. 2 is a front elevation view of the latch attached to the platform and holding the lower end of the J-tube.
Figure 3:
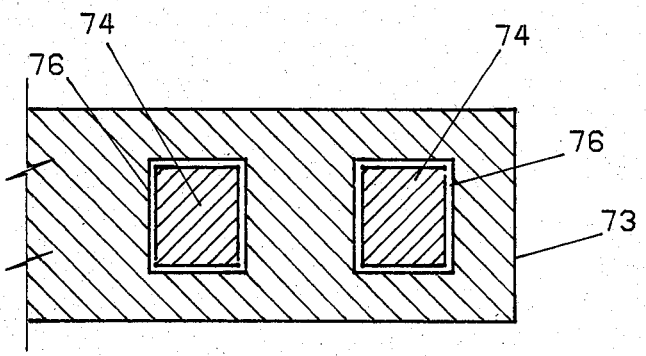
FIG. 3 is a horizontal cross-sectional view of the latch taken along the line 3—of FIG. 2.

A front view of latch 70 holding lower end 54 is shown in FIG. 2. Yoke 71 is provided with two downwardly extending arms 74 of rectangular cross section. The yoke arms 74 may be hollow and may be flooded after submersion. Arms 74 pass through guide 73 which is fixed to platform jacket 24 and extends laterally from platform 20. To accommodate arms 74, two rectangular slots 76 are provided in guide 73 as shown in detail in FIG. 3. Slots 76 are slightly larger than arms 74 so that the arms pass slidably through guide 73.

Yoke 71 and lower end 54 can be positioned at various elevations by raising and lowering cable 72 using a winch or other means on deck 22, with arms 74 sliding through slots 76. Yoke 71 is long enough to permit positioning end 54 above the maximum expected mudline 28 or at any lower elevation along spud can 26. Alternate means may be provided on latch 70 for moving yoke 71 vertically. For example, a guide track may be fixed on platform jacket 24 and a carriage fixed on yoke 71 (not shown). Additionally, such an arrangement may permit retrieval of the entire yoke 71 to the ocean surface 12. Various remotely operated mechanical means may replace cable 72.

Figure 4:
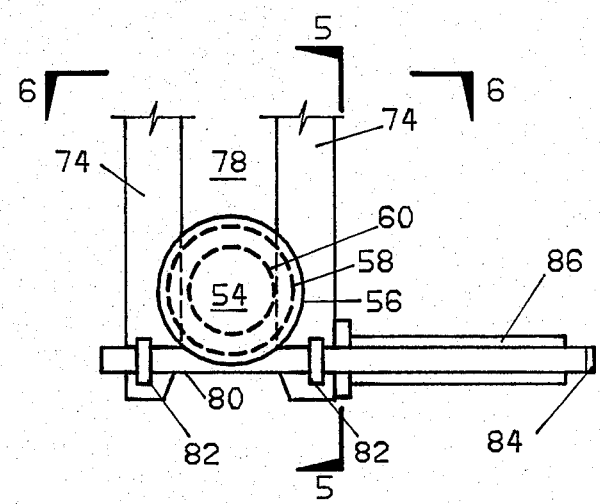
FIG. 4 is an enlargement of a portion of FIG. 2 showing the placement of the lower end of the J-tube in the latch.

Referring to FIG. 2, yoke 71 and guide 73 are positioned perpendicularly to the length of lower end 54. The spacing of yoke arms 74 forms a passage 78 therebetween for receiving end 54. The placement of end 54 in latch 70 is shown in detail in front, side, and top views in FIGS. 4, 5, and 6 respectively. As shown in FIG. 4, the width of passage 78 is greater than the diameter of neck 60 of lower end 54 so that neck 60 fits within passage 78. The width of passage 78 is, however, smaller than the diameter of collars 58 so that collars 58 do not enter passage 78. As shown in FIG. 6, the thickness of arms 74 is less than the distance between the two collars 58 so that the arms can be placed on opposite sides of neck 60 between collars 58. When neck 60 is received within passage 78, end 54 is prevented from moving along its longitudinal axis A and along a diametrical axis B perpendicular to axis A (shown in FIG. 6). Any force applied to end 54 along axis A in either direction pushes one of the collars 58 against arms 74. Arms 74 act as abutment surfaces against a collar 58 to arrest the movement of end 54 along axis A. Upon the application of force to end 54 along axis B in either direction, neck 60 is pushed against one of the yoke arms 74 which arrests movement of end 54. Thus yoke 71 restrains any lateral movement of the J-tube lower end with respect to platform 20 and may be referred to as means for restraining the lower end of the J-tube.

Instead of collars 58, any raised surfaces may be provided on end 54 such as stop pins or square plates, each having a circular opening for accommodating end 54. Likewise, latch 70 may include alternate restraint means of various shapes rather than a yoke. It is only necessary that the restraint means on latch 70 come into contact with the raised surfaces on end 54 to prevent movement along axis A as described. If a force is to be applied to end 54 along axis A in only one direction, and if that direction is known in advance, then only one raised surface need be provided.

Figure 5:
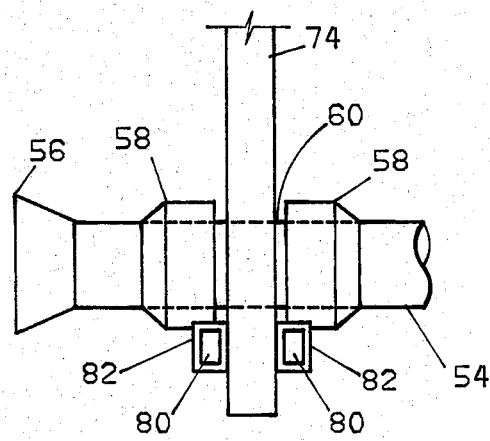
FIG. 5 is a side cross-sectional view of the latch and the lower end of the J-tube taken along the line 5—5 of FIG. 4.
Figure 6:
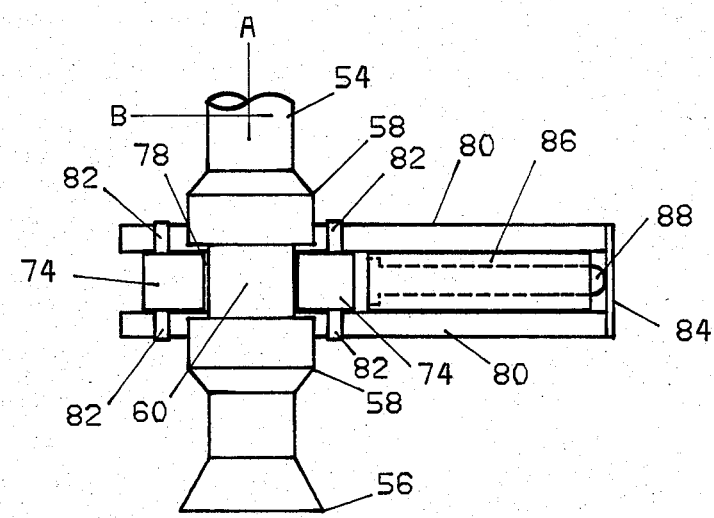
FIG. 6 is a top cross-sectional view of the latch and the lower end of the J-tube taken along the line 6—6 of FIG. 4.

Referring to FIGS. 4 through 6, J-tube lower end 54 is supported within latch 70 by two sliding horizontal bars 80 attached to yoke 71. The two bars 80 are positioned on either side of yoke 71 and span passage 78. In the specific embodiment of the latch shown in FIGS. 4 through 6, each of the two collars 58 on end 54 contacts one of the bars 80 so that the lower end 54 is supported by the bars. Yoke 71 is provided with four brackets 82, each of the bars 80 passing slidably through two of the brackets 82. Bars 80 project beyond yoke 71 and are joined at their projecting ends by end plate 84. The bars are made retractable by means of a hydraulic cylinder 86 positioned between bars 80 and fixed to one of the yoke arms 74. As shown in FIG. 6, a piston 88 within hydraulic cylinder 86 extends beyond cylinder 86 and is fixed to end plate 84. Cylinder 86 is capable of being hydraulically actuated so that piston 88 is forced out of cylinder 86 and moves end plate 84 and bars 80 away from yoke 71. Bars 80 are able to slide through brackets 82 clear of passage 78. Latch 70 is therefore capable of releasing end 54 from yoke 71. Cylinder 86 is capable of being deactivated to return bars 80 to their original positions spanning passage 78.

Hydraulic cylinder 86 is only one of many suitable means which may be provided for retracting bars 80. An alternate means is a hinged connection at one end of bars 80 which when actuated permits the bars to swing downwardly to a vertical position clear of passage 78. Rather than being supported by bars 80, lower end 54 may be supported by a second cable (not shown) run from the deck 22. End 54 can then be released from yoke 71 when this second cable is lowered. And yoke 71 is then retrievable to the ocean surface 12 because the entire arms 74 are able to pass through slots 76 without obstruction.

Figure 7:
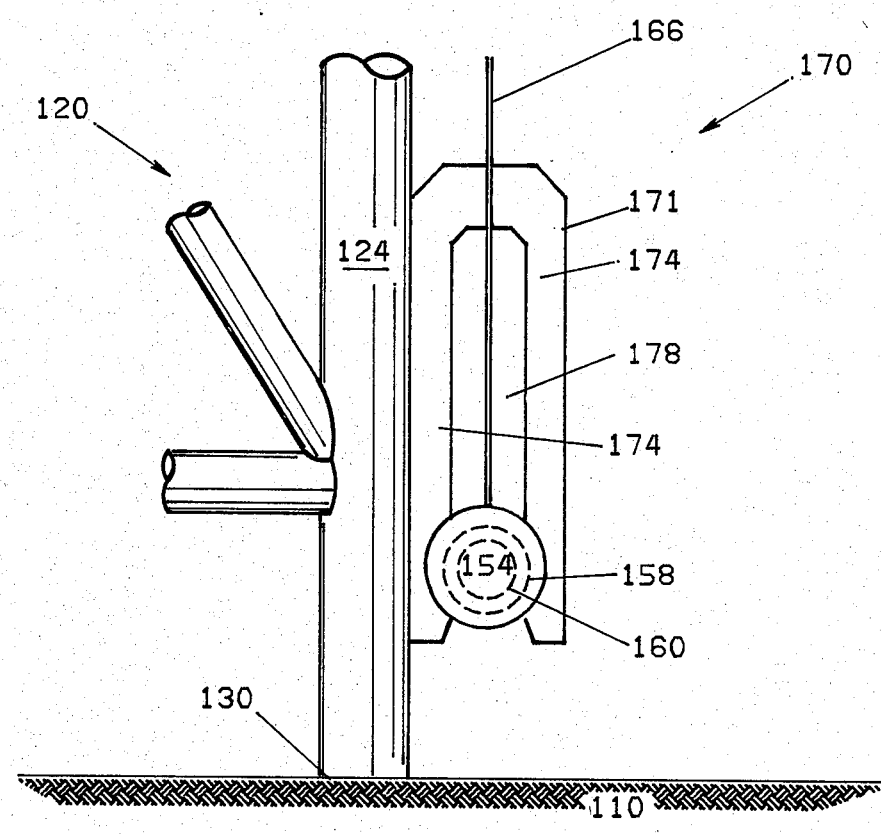
FIG. 7 is a front elevation view of an alternate embodiment of the latch shown in FIG. 2.

An alternate embodiment of the latch in FIG. 2 is shown in FIG. 7. Latch 170 is shown fixed to a platform 120 which has a conventional pile foundation (not shown) rather than a spud can. In this embodiment, yoke 171 is fixedly attached to platform jacket 124. The neck 160 of end 154 is restrained in passage 178 by yoke arms 174 and collars 158 as in the previously described embodiment. Lower end 154 is supported by a cable 166 rather than by bars. By raising or lowering cable 166, end 154 can be positioned at various elevations within passage 178. End 154 can be released from latch 170 to the seafloor 110 by lowering cable 166 below yoke 171. Alternate remotely operable means may be used for vertically positioning lower end 154.

The operation of the present invention is shown in sequential stages in FIGS. 1, 8, 9 and 10. In operation, J-tube 40 and latch 70 are mounted on platform 20 during land fabrication thus avoiding the need for diver assistance after submersion. Upper longitudinal section 44 of J-tube 40 is passed through guide rings 46 as described above. Latch 70 is mounted by fixing yoke guide 73 to platform jacket 24. End 54 is placed in its restrained position in latch 70. Depending on the particular method selected for installation of the pipeline riser, which is discussed below, it may be desirable to preinstall a portion of the riser in sections 44 and 48 of the J-tube at this time. Before platform erection, the extent of platform settlement which will occur cannot be accurately predicted although a range can be estimated. The final location of the mudline on platform 20 is therefore unknown and only the maximum expected mudline 28 is known. To accommodate maximum settling of platform 20 without forcing the J-tube into the seafloor 10, all parts of J-tube 40 and latch 70 are positioned above maximum expected mudline 28 as shown in FIG. 1. Positioning is accomplished by sliding J-tube section 44 through guide rings 46 and sliding yoke 71 carrying J-tube lower end 54 through guide 73. Platform 20 is then placed on the seafloor 10 at the chosen offshore site with cable 72 supporting yoke 71 and end 54. The weight of the J-tube may be supported by a crane or other means on deck 22. Platform 20 is shown immediately after placement in FIG. 1. Next, spud can 26 is weighted by pumping drilling mud into its shell structure. Platform 20 then settles extensively as spud can 26 penetrates the seafloor 10.

A test was performed to study the settling of a spud can-founded platform in October, 1975. The test platform ws a 20 foot (6.1 meters) by 20 foot (6.1 meters) square spud can-founded guyed tower. The test was conducted in the Gulf of Mexico in a water depth of 293 feet (89.4 meters). After placing the structure on the seafloor, 320,000 pounds (145,000 kilograms) of drilling mud were pumped into the spud can bringing the total load applied to the platform to 672,000 pounds (305,000 kilograms). Immediately after application of this maximum load, the spud can penetrated 22 feet (6.7 meters) into the seafloor. During the following 47 days, the spud can penetrated an additional 3.5 feet (1.1 meters), bringing the total distance of settlement to 25.5 feet (7.8 meters).

Figure 8:
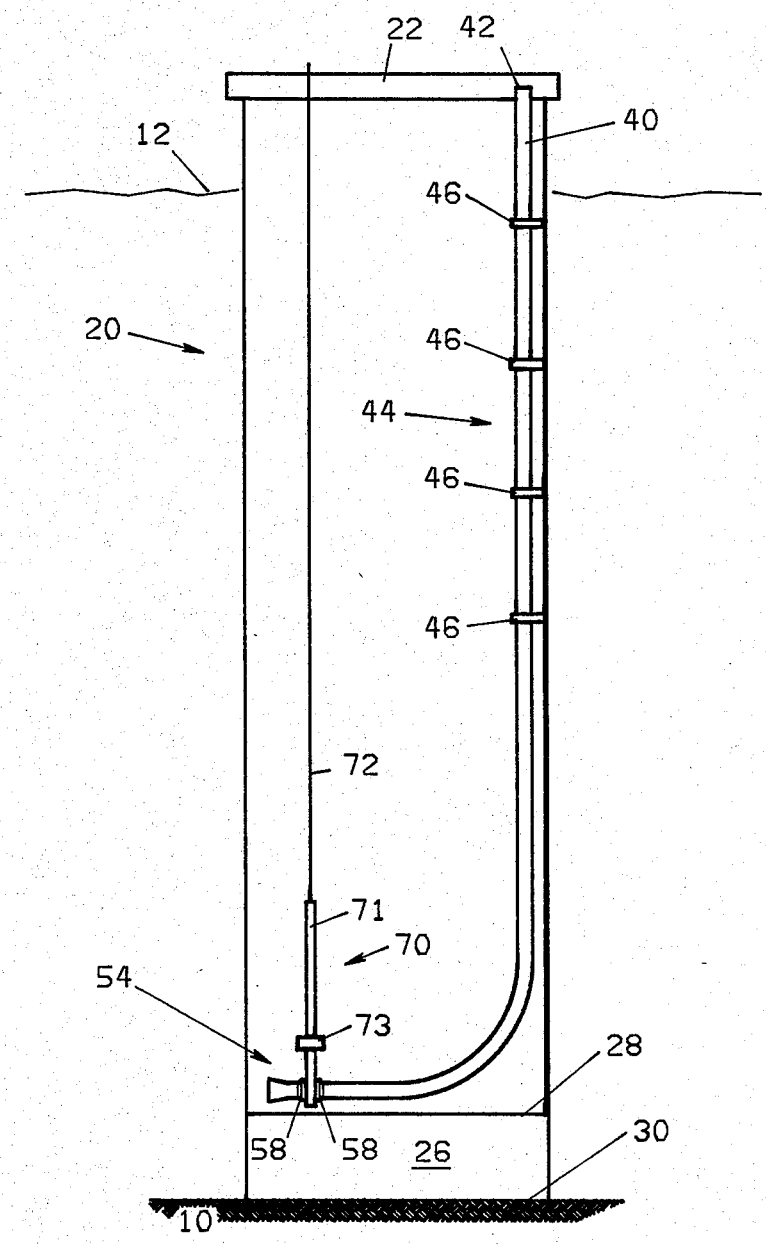
FIGS. 8 through 10 are views of the apparatus shown in FIG. 1, but at subsequent sequential stages of operation.

FIG. 8 shows platform 20 at a later time after spud can 26 has penetrated the seafloor 10. During settling, J-tube 40 and latch 70 maintain their positions on platform 20 and are lowered with it. J-Tube section 44 is not permitted to move through guide rings 46 and yoke 71 is not permitted to move through guide 73. Although minor long-term settling may yet occur, platform 20 is substantially at its final elevation and the drilling mud may be removed from spud can 26. An actual mudline 30 is now established and is below the maximum expected mudline 28. The J-tube assembly may be maintained at its elevation on the platform above maximum mudline 28 until it is needed for installation of a pipeline riser prior to production operations. If it will not be used for a long period of time during which exploration and drilling operations are conducted, upper orifice 42 of the J-tube may be temporarily attached rigidly to the platform by welding (not shown) or other means. During this inactive period, the restraint of J-tube lower end 54 in latch 70 fixes the configuration of the J-tube. But flexibility of the J-tube is not required during this period because the J-tube is not yet operably associated with a subsea pipeline and the J-tube as a whole moves with the platform in response to environmental forces.

Figure 9:
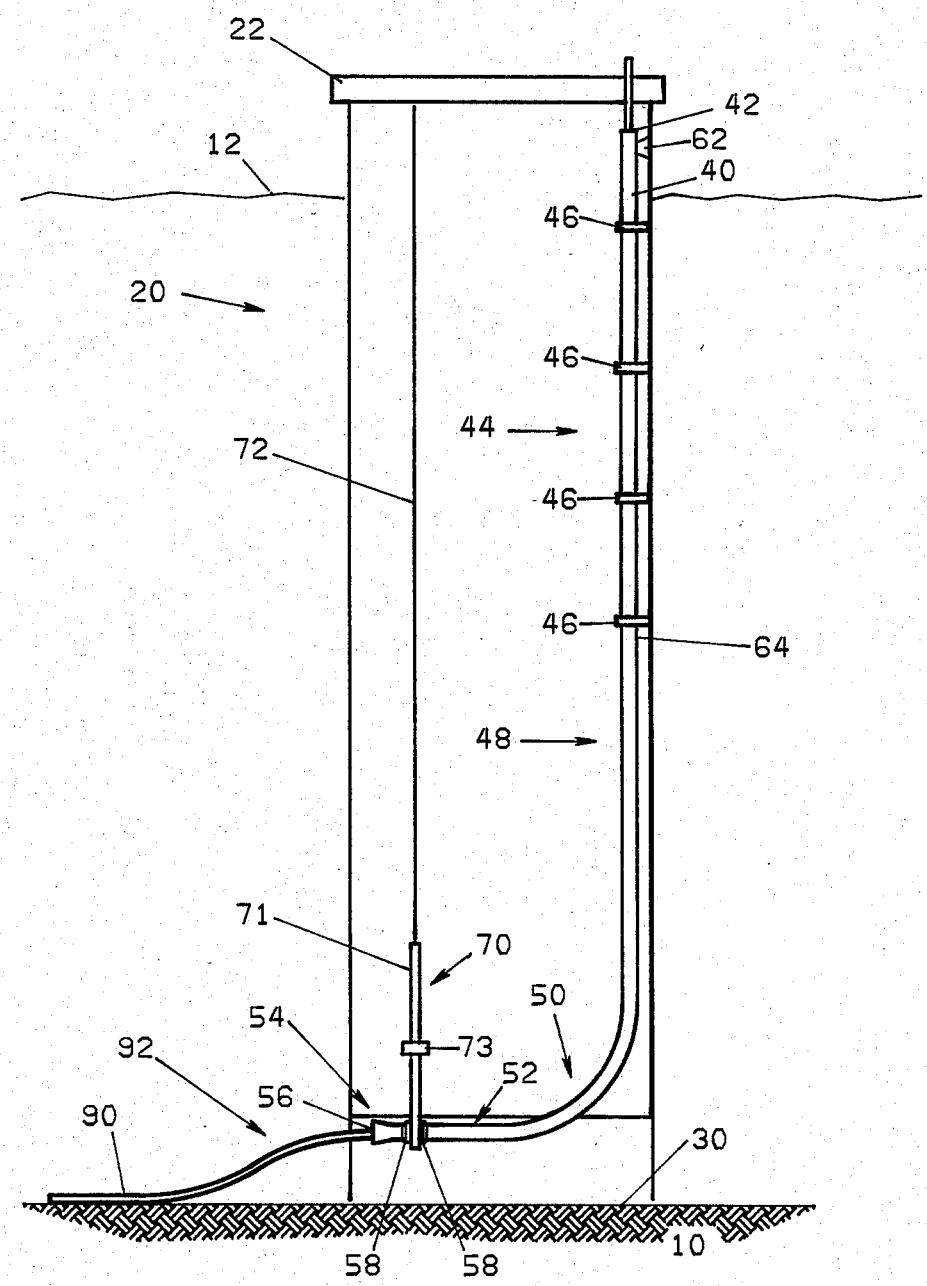

When J-tube 40 is needed for installation of an oil production riser, it is lowered along platform 20 to an elevation at which lower end 54 is a short distance above actual mudline 30 suitable for riser installation as shown in FIG. 9. This suitable distance is generally no greater than five feet (1.5 meters). If the J-tube has been temporarily welded to the platform, the welds are cut to enable lowering. All parts of the J-tube, including end 54, are lowered the same distance so that the J-tube maintains its shape. J-tube section 44 slides through guide rings 46. Cable 72 is lowered at deck 22 so that yoke 71 slides in guide 73 and end 54 is lowered. For ease in handling, section 44 and end 54 may be lowered in stepwise increments, alternating between lowering section 44 and end 54. End 54 continues to be restrained from lateral movement by latch 70. At this time, J-tube section 44 is fixed to the platform at upper orifice 42 by welds 62 as it will not be lowered again. The J-tube is now positioned for installation of a pipeline riser 90. The lowering of end 54 to an elevation near the seafloor 10 prevents the production of excessive movements in the free span 92 of riser 90 between J-tube end 54 and the mudline 30 during riser installation. See FIG. 9.

Next, riser 90 is installed in J-tube 40 using known methods. It may be inserted in lower J-tube orifice 56 and forced up through the tube or inserted in upper J-tube orifice 42 and forced down through the tube. During riser installation, considerable forces are applied to pipeline riser 90 and J-tube 40. Latch 70 provides the necessary reactions to these forces to reduce lateral displacement of J-tube lower end 54 and thereby reduce stress in the J-tube and riser, especially in the riser near lower end 54 and in the riser and J-tube at a point 64 below the lowest guide ring 46. When riser 90 is forced through the J-tube along axis A (shown in FIG. 6), one of the collars 58 is forced against yoke arms 74 which arrest movement of the lower end. Because the lower end is restrained from lateral movement relative to platform 20, buckling of the riser and J-tube at point 64 is prevented. Stresses are kept below the allowable limits of the materials and damage to pipeline riser 90, J-tube 40, and other equipment is avoided.

Figure 10:
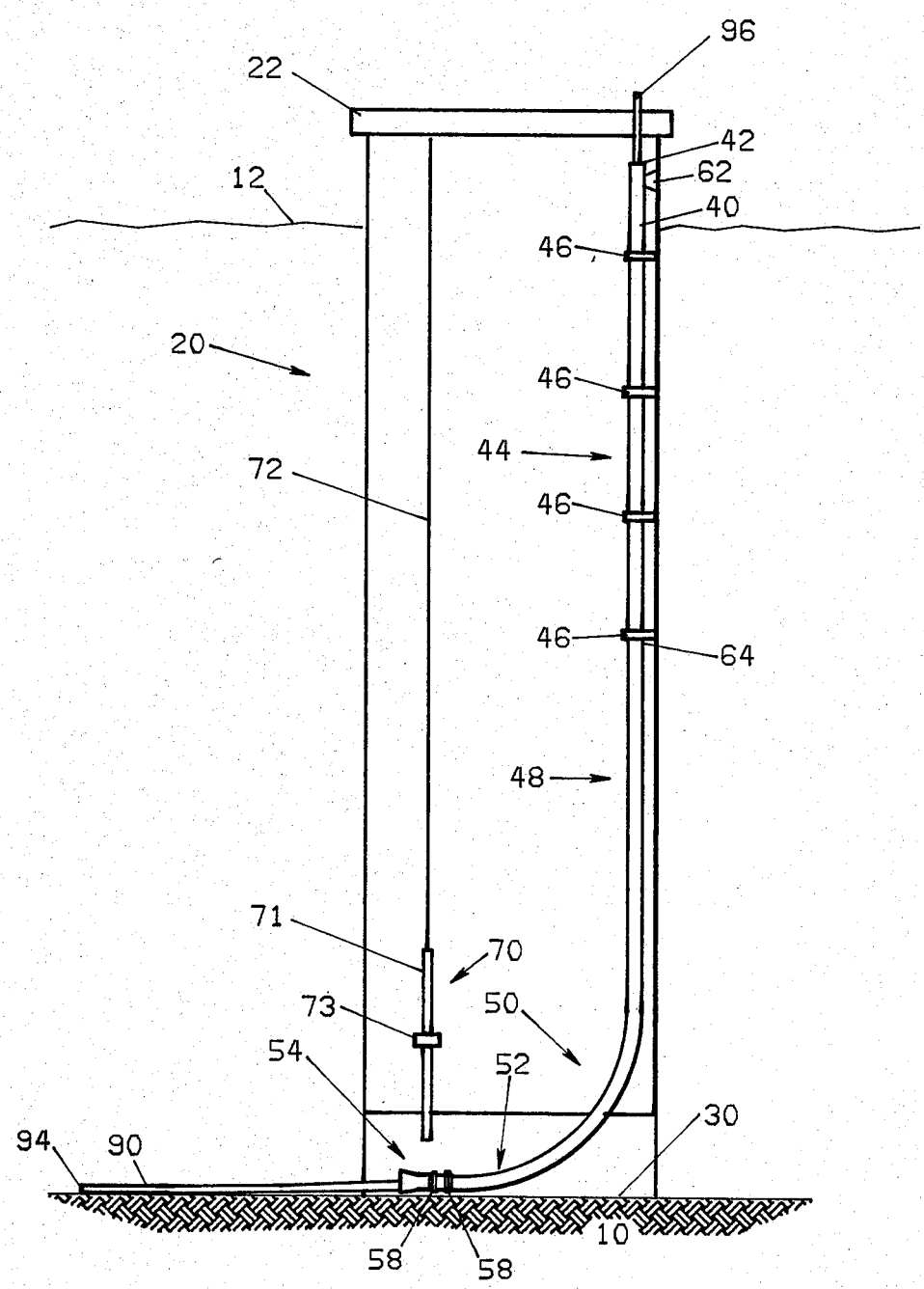

After installation of pipeline riser 90 in the J-tube, lower end 54 is released from latch 70 thereby permitting the force of gravity to flex said guide tube so that the lower end descends toward the seafloor 10 as shown in FIG. 10 to permit proper functioning of the J-tube during production operations. To release the J-tube end, hydraulic cylinder 86 of latch 70 is actuated, forcing piston 88 out of the cylinder (see FIG. 6). Piston 88 pushes end plate 84 and sliding bars 80 away from yoke 71. When bars 80 are retracted clear of passage 78, unsupported end 54 descends to the seafloor 10. If desired, appropriate mechanical means may be employed in addition to the force of gravity to move the lower end downwardly to the seafloor. During the descent of end 54, only bend section 50 and lateral section 52 of J-tube 40 are moved downwardly. Longitudinal sections 44 and 48 of the J-tube are held at a constant elevation on the platform by welds 62. The J-tube is now in position for production of oil through riser 90. A lower end 94 of riser 90 is operably connected to a subsea pipeline for transporting recovered oil away from platform 20. An upper end 96 of the riser is connected to facilities on deck 22 which are supplied with oil produced from subsea wells. In the present discussion, the installation of a pipeline riser for transporting recovered oil away from the platform is described. However, the present J-tube assembly may be used to install any service line extending upwardly from the seafloor to the water surface. Some such service lines are pipelines for transporting fluids from a subsea well to a platform or away from a platform to a subsea pipeline, another offshore facility, or an onshore facility. Other service lines which may be installed in the J-tube are electrical cables and hydraulic control lines.

During production operations, compliant platform 20 moves in response to the forces of wind, waves, and current. A compliant platform pivots about a point on its vertical axis some distance below the mudline, displacing the surrounding soil slightly. Typical maximum excursions from plumb are on the order of two or three degrees. The platform also twists about its vertical axis. Upper end 96 of riser 90 moves relative to the subsea pipeline connected to lower end 94 of the riser. According to the invention, J-tube 40 accommodates these motions. With the J-tube lower end 54 released from the latch, lower longitudinal section 48, bend section 50, and lateral section 52 of the J-tube are free of platform 20. These three sections are therefore capable of flexing as the platform moves relative to the subsea pipeline. The entire length of the J-tube below welds 62, including sections 44, 48, 50 and 52 is capable of twisting about its longitudinal axis. The slidable manner in which section 44 passes through guide rings 46 allows section 44 to twist. Flexibility of the J-tube permits displacement of the platform to be distributed over a significant length of the J-tube and riser so that excessive stress is avoided. The movement of the platform is not hampered, and damage to the J-tube and riser is prevented. The flexible J-tube also accomodates thermal expansion and contraction of riser 90 and long-term settlement of platform 20.

For application to a pile-founded compliant platform rather than a spud can-founded platform, an alternate method of operation using the alternate latch embodiment of FIG. 7 is employed. Because pile-founded platform 120 will not settle significantly, the location of actual mudline 130 is substantially known before platform erection. Yoke 171 need not be lowered along platform 120 and is therefore fixed permanently to jacket 124 above actual mudline 130. Before platform erection, J-tube 140 is positioned at an elevation at which lower end 154 is a short distance above the mudline 130 suitable for pipeline riser installation as in FIG. 9. Platform 120 is then erected and a pipeline riser is installed in the J-tube. J-Tube lower end 154 is released from latch 170 by lowering cable 166.

The method and apparatus of the invention and the best mode contemplated for applying that method have been described. It should be understood that the foregoing is illustrative only and that other means and obvious modifications can be employed without departing from the true scope of the invention defined in the claims.

We claim:

1. A method for installing a service line extending upwardly from the seaflor through a curved guide tube at an offshore structure, the guide tube including a generally longitudinal upper segment, a substantial, generally longitudinal lower segment, a generally lateral segment, and a lower end, said method comprising:
    connecting said upper segment to the structure so that it cannot move substantially laterally with respect to the structure, but can be moved longitudinally with respect to the structure, leaving said lower segment and said lateral segment free of the structure;
    restraining said lower end so that it cannot move substantially laterally with respect to the structure, but can be moved longitudinally with respect to the structure;
    moving the tube with respect to the structure to an elevation at which said lateral segment is above the highest expected mudline on the structure after settling;
    placing the structure on the seafloor;
    permitting the structure to settle to its substantially final elevation;
    lowering the tube with respect to the structure until said lower end is a short distance above the seafloor;
    drawing said service line through the tube; and
    releasing said lower end, thereby permitting the force of gravity to flex said guide tube so that said lower end descends toward the seafloor.

2. The method of claim 1 wherein the step of connecting said upper segment to the structure is performed so that said upper segment can rotate about is longitudinal axis.

3. An assembly for installing a riser at an offshore platform, the platform having a platform deck, said assembly comprising:
    a J-tube having a lower end;
    two collars fitted around said lower end and spaced apart along the length of said lower end;
    at least one guide fixed to a lower portion of the platform and extending horizontally therefrom;
    a yoke adapted to pass slidably through said guide, said yoke including two downwardly extending arms, spaced apart horizontally and adapted to pass between said two collars and over said lower end, said yoke thereby cooperating with said two collars to restrict horizontal movement of said lower end;
    a cable run from the platform deck and attached to said yoke for vertically moving said yoke through said guide; and
    a support bar mounted on a lower portion of said yoke and extending across said two arms for holding said lower end in said yoke, said bar being retractable for releasing said lower end from said yoke to the seafloor.

4. The assembly of claim 3 further comprsing a remotely operated hydraulic cylinder for retracting said bar.

5. An assembly for installing a riser at an offshore platform, the platform having a platform deck, said assembly comprising:
    a J-tube having a lower end;
    two collars fitted around said lower end and spaced apart along the length of said lower end;
    a yoke fixed on the platform, said yoke including two downwardly extending arms, spaced apart horizontally and adapted to pass between said two collars and over said lower end, said yoke thereby cooperating with said two collars to restrict horizontal movement of said lower end; and
    a support cable run from the platform deck and attached to said lower end for vertically moving said lower end in a passage between said two arms and for lowering said lower end to release said lower end from said yoke to the seafloor.

* * * * *